United States Patent
Seo

(10) Patent No.: US 12,249,935 B2
(45) Date of Patent: Mar. 11, 2025

(54) MOTOR CONTROL DEVICE

(71) Applicant: DENSO CORPORATION, Kariya (JP)

(72) Inventor: Yuichi Seo, Kariya (JP)

(73) Assignee: DENSO CORPORATION, Kariya (JP)

( * ) Notice: Subject to any disclaimer, the term of this patent is extended or adjusted under 35 U.S.C. 154(b) by 165 days.

(21) Appl. No.: 18/057,893

(22) Filed: Nov. 22, 2022

(65) Prior Publication Data

US 2023/0261598 A1  Aug. 17, 2023

(30) Foreign Application Priority Data

Feb. 14, 2022 (JP) .................................. 2022-020689

(51) Int. Cl.
| | | |
|---|---|---|
| H02P 29/024 | (2016.01) | |
| H02P 3/18 | (2006.01) | |
| H02P 23/14 | (2006.01) | |
| H02P 27/08 | (2006.01) | |

(52) U.S. Cl.
CPC ................ H02P 23/14 (2013.01); H02P 3/18 (2013.01); H02P 27/08 (2013.01)

(58) Field of Classification Search
CPC ...... H02P 27/08; H02P 29/027; H02P 29/024; H02P 3/18; H02P 23/14

USPC .......................................................... 318/445
See application file for complete search history.

(56) References Cited

U.S. PATENT DOCUMENTS

| | | | | |
|---|---|---|---|---|
| 9,473,059 | B2* | 10/2016 | Omata | ..................... B60L 50/40 |
| 2014/0217940 | A1 | 8/2014 | Kawamura | |
| 2017/0131378 | A1* | 5/2017 | Murata | ...................... B60L 1/00 |
| 2019/0252970 | A1* | 8/2019 | Ohdaira | .................. H02M 1/32 |
| 2022/0131494 | A1* | 4/2022 | Tan | ......................... H02P 29/026 |

FOREIGN PATENT DOCUMENTS

| | | |
|---|---|---|
| JP | 2006-321411 A | 11/2006 |
| JP | 4012031 B2 | 11/2007 |
| JP | 2007-314063 A | 12/2007 |
| JP | 2008-067570 A | 3/2008 |

* cited by examiner

*Primary Examiner* — Gabriel Agared
(74) *Attorney, Agent, or Firm* — Posz Law Group, PLC

(57) ABSTRACT

A motor control device performs driving control of a motor via a drive circuit that converts a power supply voltage of a direct current power supply into a drive voltage of the motor. The motor control device includes a voltage measurement circuit that measures the power supply voltage. The motor control device acquires a detection signal correlated with a current value that is output from a current detection circuit.

9 Claims, 9 Drawing Sheets

MOTOR CONTROL DEVICE

CROSS REFERENCE TO RELATED APPLICATION

This application is based on Japanese Patent Application No. 2022-020689 filed on Feb. 14, 2022, the disclosure of which is incorporated herein by reference.

TECHNICAL FIELD

The present disclosure relates to a motor control device.

BACKGROUND

An exemplary motor control device includes a microcomputer, an inverter circuit, a position detection circuit, a current detection circuit, and the like.

SUMMARY

The present disclosure provides a motor control device that performs driving control of a motor via a drive circuit that converts a power supply voltage of a direct current power supply into a drive voltage of the motor. The motor control device includes a voltage measurement circuit that measures the power supply voltage. The motor control device acquires a detection signal correlated with a current value that is output from a current detection circuit.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
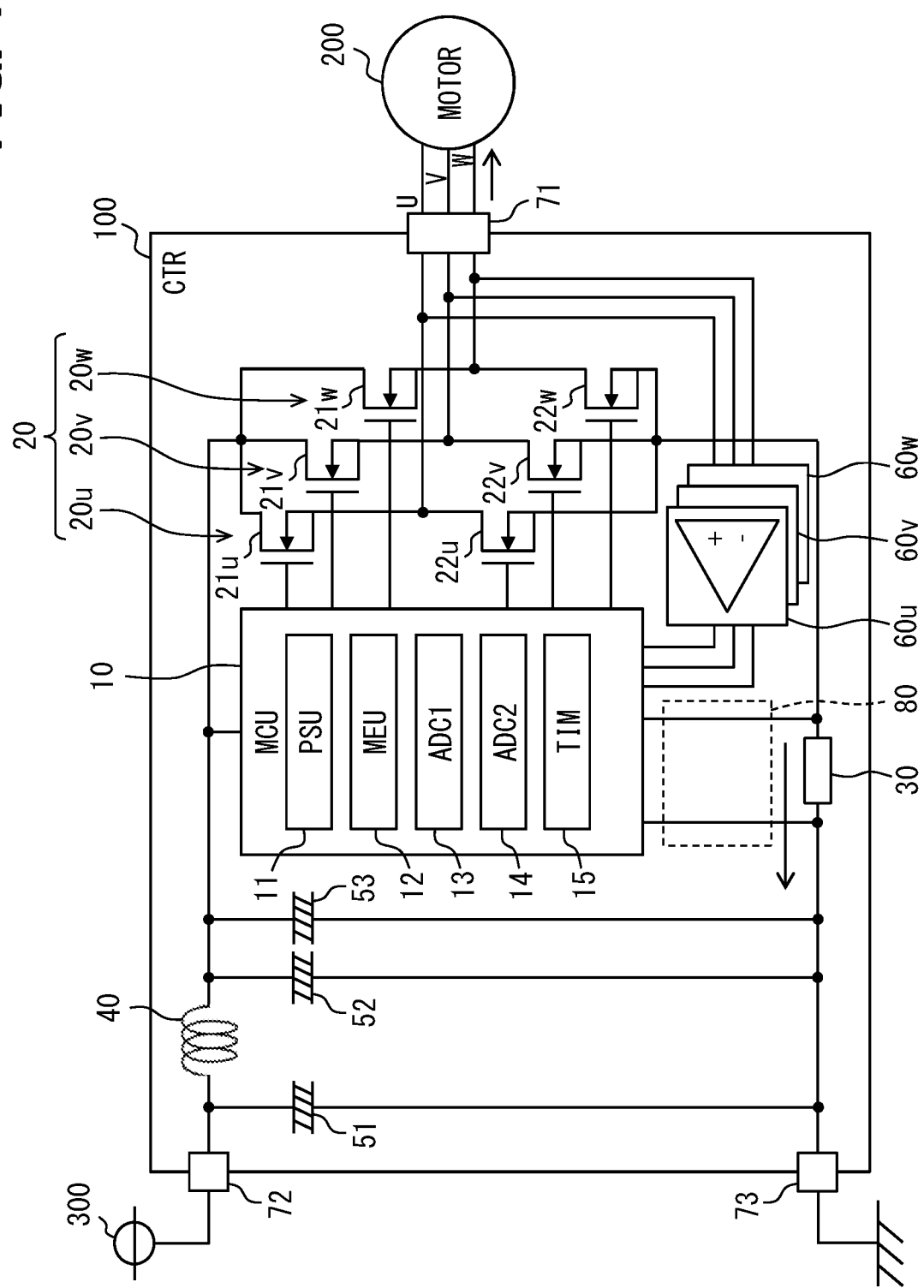
FIG. 1 is a block diagram illustrating a schematic configuration of a control device in a first embodiment.

It is conceivable that a motor control device uses an output of a current detection circuit for determination of overcurrent prevention and circuit disconnection detection by a microcomputer. The microcomputer may recognize that a current value is fixed at a constant value such as 0 A or a maximum value due to a failure of the current detection circuit. In this case, even though there is no abnormality in the motor, the microcomputer cannot appropriately drive the motor due to the reason that the motor cannot be driven by a protection function, the protection function cannot be operated at a time of abnormality, or the like.

The present disclosure provides a motor control device capable of driving a motor regardless of a detection result of a current detection circuit.

An exemplary embodiment of the present disclosure provides a motor control device that includes a controller configured to perform driving control of a motor via a drive circuit that converts a power supply voltage of a direct current (DC) power supply into a drive voltage of the motor. The controller includes a voltage measurement circuit configured to measure the power supply voltage. The controller acquires a detection signal correlated with a current value that is output from a current detection circuit. The current value flows through a winding of the motor in response to the drive voltage being applied to the motor. The controller includes a failure estimation unit, a driving determination unit, and a driving control unit. The failure estimation unit is configured to estimate a current detection failure in the current detection circuit by using the detection signal. The driving determination unit is configured to determine whether the driving control of the motor is possible by using a measured value of the power supply voltage measured by the voltage measurement circuit when the failure estimation unit estimates the current detection failure. The driving control unit is configured to (i) stop the driving control when the driving determination unit determines that the driving control is impossible, and (ii) estimate the current value from the measured value, and continues the driving control by using the current value estimated when the driving determination unit determines that the driving control is possible.

In the exemplary embodiment of the present disclosure, when the current detection failure is estimated, whether or not the driving control of the motor is possible is determined using the measured value of the power supply voltage. When it is determined that the driving control is possible, the motor control device continues the driving control of the motor by using the current value estimated from the measured value of the power supply voltage. Therefore, the motor control device can drive the motor regardless of the detection result of the current detection circuit.

Another exemplary embodiment of the present disclosure provides a motor control device that includes a controller configured to perform driving control of a motor via a drive circuit that converts a power supply voltage of a direct current power supply into a drive voltage of the motor. The control device includes a voltage measurement circuit configured to measure the power supply voltage. The controller estimates a current value flowing through a winding of the motor in response to the drive voltage being applied to the motor from a measured value of the power supply voltage measured by the voltage measurement circuit, and executes the driving control by using the current value estimated.

In another exemplary embodiment of the present disclosure, the motor control device performs driving control by using the current value estimated from the measured value of the power supply voltage. Therefore, the motor control device can drive the motor regardless of the detection result of the current detection circuit. The motor control device does not need to include the current detection circuit.

Hereinafter, a plurality of embodiments for carrying out the present disclosure will be described with reference to the drawings. In each embodiment, parts corresponding to matters described in the preceding embodiment are denoted by the same reference numerals, and redundant description may be omitted. In each embodiment, when only a part of a configuration is described, other parts of the configuration can be applied by referring to the other embodiments described previously.

First Embodiment

A control device (CTR) 100 according to the present embodiment will be described with reference to FIGS. 1 to 5. In the present embodiment, a motor control device is applied to the control device 100. The control device 100 is a device that controls a motor 200. The control device 100 can be applied to, for example, a device that controls the motor 200 of a fuel pump. The fuel pump is a device for supplying fuel to an engine in a vehicle including the engine. Therefore, the control device 100 controls the fuel supply to the engine using the motor 200.

The control device 100 performs driving control of the motor 200 without using a Hall element. That is, the control device 100 is a device that drives the motor 200 in a sensorless manner. The sensorless drive can be applied with reference to JP 2017-28943 A. The control device 100 performs driving control of the motor 200 by rectangular wave sensorless control.

In FIG. 1, a microcomputer 10 is referred to as MCU, a processing device 11 is referred to as PSU, a memory 12 is referred to as MEU, a first AD converter 13 is referred to as ADC 1, a second AD converter 14 is referred to as ADC 2, and a timer 15 is referred to as TIM.
(Overall Configuration)

First, an overall configuration including the control device 100 and peripheral components will be described with reference to FIG. 1. The control device 100 includes at least a microcomputer 10. However, in the present embodiment, as an example, the control device 100 including other components is employed in addition to the microcomputer 10. Other components include an inverter circuit 20, a shunt resistor 30, a coil 40, capacitors 51 to 53, position detection circuits 60u, 60v, and 60w, terminals 71 to 73, a circuit unit 80, and the like.

The control device 100 is electrically connected to the motor 200 to be controlled via a motor terminal 71. The control device 100 is electrically connected to a battery 300 via a power supply terminal 72. The control device 100 is electrically connected to the ground via a ground terminal 73.

The control device 100 may be configured integrally with the motor 200. A structure in which the control device 100 and the motor 200 are integrated can also be referred to as a motor unit. In the motor unit, for example, the motor 200 is attached to a case that houses the control device 100. However, the control device 100 is not limited thereto, and may be provided separately from the motor 200.
(Inverter Circuit)

The inverter circuit 20 includes upper and lower arm circuits 20u, 20v, and 20w. The upper and lower arm circuit 20u includes switching elements 21u and 22u. The switching elements 21u and 22u are electrically connected to a u-phase coil (winding) of the motor 200. The upper and lower arm circuit 20v includes switching elements 21v and 22v. The switching elements 21v and 22v are electrically connected to a v-phase coil of the motor 200. The upper and lower arm circuit 20w includes switching elements 21w and 22w. The switching elements 21w and 22w are electrically connected to a w-phase coil of the motor 200.

Figure 4:
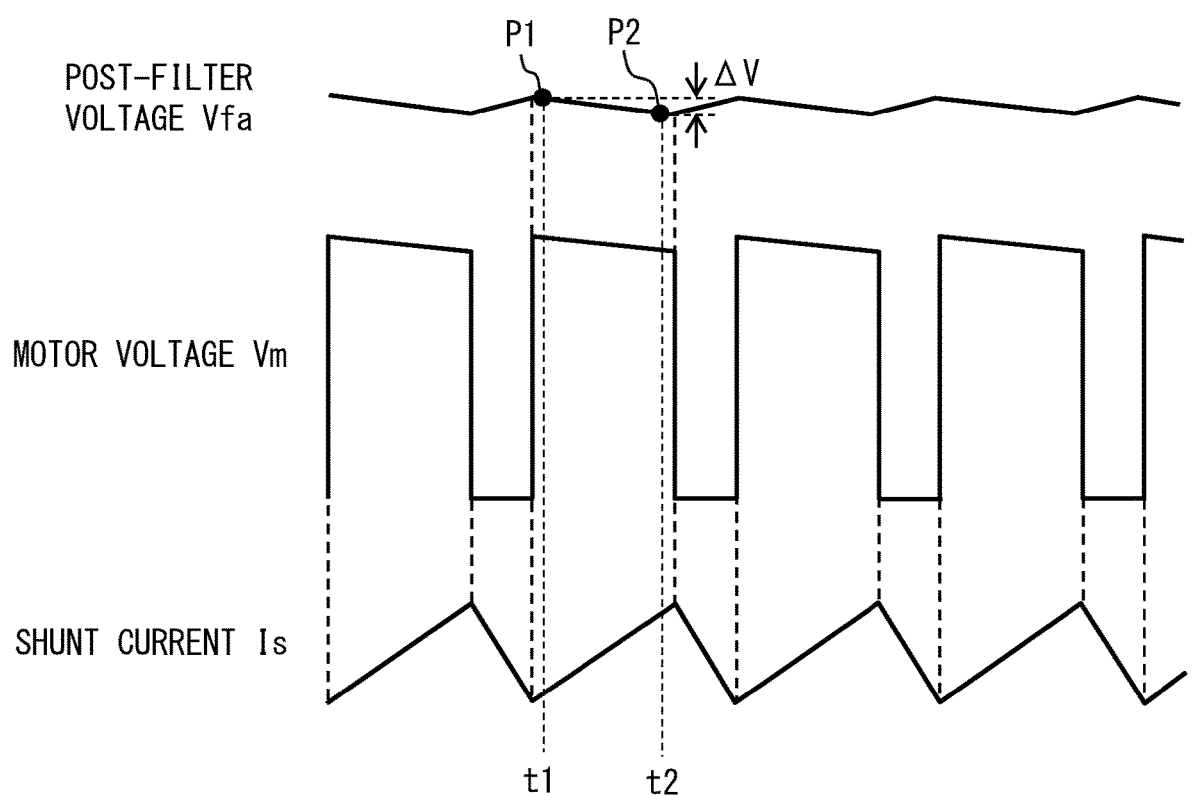
FIG. 4 is a various waveform diagram at a time of driving a motor in the first embodiment.

In the inverter circuit 20, the microcomputer 10 performs ON-OFF control of the switching elements 21u, 21v, 21w, 22u, 22v, and 22w. Thus, the inverter circuit 20 converts a power supply voltage of the battery 300 into a drive voltage (motor voltage Vm) of the motor 200. In other words, the inverter circuit 20 generates the motor voltage Vm having a constant cycle of ON and OFF of a pulse train from the power supply voltage of a constant voltage. As illustrated in FIG. 4, the inverter circuit 20 applies a motor voltage Vm to the motor 200. The microcomputer 10 can change the ON time width of the motor voltage Vm by ON/OFF control. The inverter circuit 20 corresponds to a drive circuit.
(Current Detection Circuit)

Figure 2:
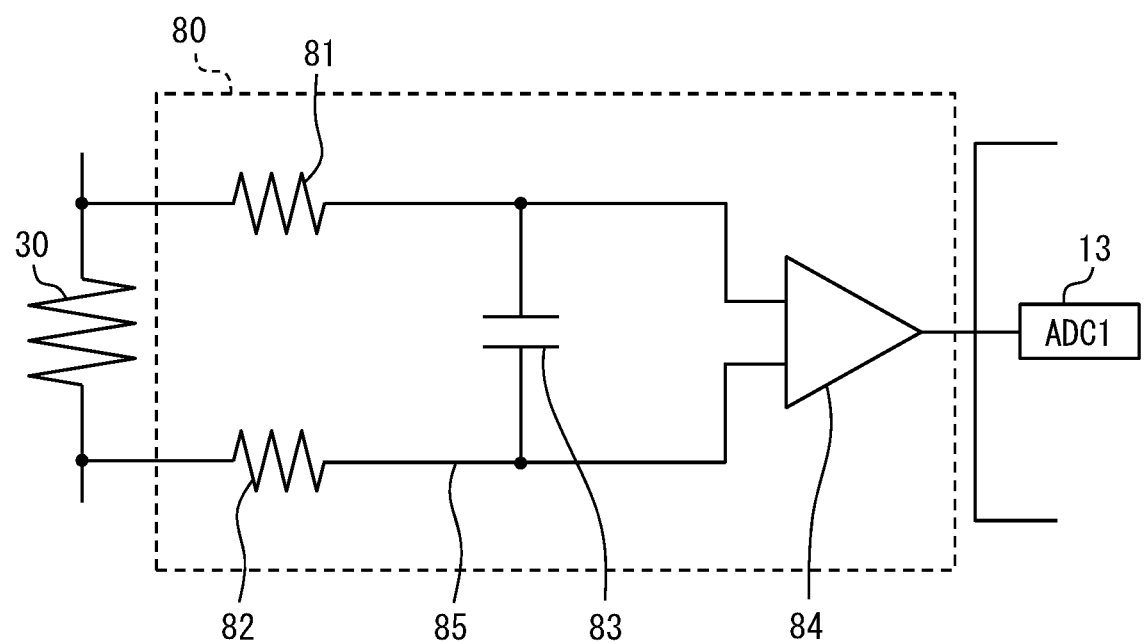
FIG. 2 is a circuit diagram illustrating a schematic configuration of a current detection circuit in the first embodiment.

The control device 100 includes the shunt resistor 30 and the circuit unit 80 as a current detection circuit. As illustrated in FIG. 2, the circuit unit 80 includes resistors 81 and 82, a capacitor 83, an amplifier 84, a detection line 85 connecting these components, and the like.

The current detection circuit detects a current (motor current) flowing through the motor 200 using the shunt resistor 30. That is, the current detection circuit detects a shunt current Is flowing through the shunt resistor 30 as the motor current. The current detection circuit outputs a current value flowing through each coil of the motor 200 to the microcomputer 10 by applying a drive voltage to the motor 200. The current value is input to the first AD converter 13 of the microcomputer 10. The current value can be referred to as a current value of the motor current or the shunt current Is.
(Position Detection Circuit)

The position detection circuits 60u, 60v, and 60w include comparators. The microcomputer 10 detects the rotational speed and the position (rotational position) of a rotor by an induced voltage generated by rotation of the rotor of the motor 200. The induced voltage is a sinusoidal analog signal that changes according to the rotation of the rotor. In the present embodiment, each of the position detection circuits 60u, 60v, and 60w converts the analog signal into a rectangular wave-shaped pulse signal and inputs the pulse signal to the microcomputer 10.
(Motor)

The motor 200 includes a stator, a rotor magnet, and the like. The motor 200 further includes a rotor, a shaft, and the like. The motor 200 is a brushless three-phase motor.
(Battery and Power Supply Path)

The battery 300 supplies the power supply voltage to the microcomputer 10 and the inverter circuit 20. The microcomputer 10 is electrically connected to a power supply path (VB line) between the battery 300 and the inverter circuit 20. The coil 40 is provided in the power supply path. One terminal of each capacitor 51 to 53 is electrically connected to the power supply path.

More specifically, one terminal of the capacitor 51 is connected between the battery 300 and the coil 40. The capacitor 51 corresponds to an input-side capacitor. One terminal of the capacitor 52 is connected between the microcomputer 10 and the coil 40. The capacitor 52 corresponds to an output-side capacitor. The coil 40 and the capacitors 51 and 52 constitute a TT-type filter. The TT-type filter corresponds to a filter.

The other terminal of each capacitor 51 to 53 is electrically connected to the ground path. The power supply path is a wiring electrically connected to the power supply terminal 72. The ground path is a wiring electrically connected to the ground terminal 73. The battery 300 corresponds to a DC power supply.

(Microcomputer)

The microcomputer 10 includes the processing device 11, the memory 12, the first AD converter 13, the second AD converter 14, the timer 15, and the like. Further, the microcomputer 10 may further include an input/output interface, a bus connecting these components, and the like. The microcomputer 10 corresponds to a controller.

The microcomputer 10 is electrically connected to the inverter circuit 20, the position detection circuits 60*u*, 60*v*, and 60*w*, the battery 300, and the current detection circuit. The microcomputer 10 may be electrically connected to a host control device (not illustrated). The microcomputer 10 is supplied with electric power from the battery 300 and becomes operable.

The processing device 11 performs various arithmetic processing by executing a program stored in the memory 12. The processing device 11 can also use various values temporarily stored in the memory 12 when performing arithmetic processing. The processing device 11 performs arithmetic processing and performs driving control of the motor 200 via the inverter circuit 20. The processing device 11 may be provided by a CPU or the like.

More specifically, the processing device 11 calculates the position of the rotor from the signals input from the respective position detection circuits 60*u*, 60*v*, and 60*w*. The processing device 11 calculates a duty of the PWM control related to control of switching of the inverter circuit 20 on the basis of the calculated rotation speed of the rotor and the signal (target rotation speed) input from the host control device (not illustrated). The processing device 11 performs PWM control on the inverter circuit 20 to drive the motor 200. That is, the microcomputer 10 performs the driving control of the motor 200 by controlling the inverter circuit 20 to convert the power supply voltage into a drive voltage that repeats turning ON and OFF. It can also be said that the microcomputer 10 PWM-drives the motor 200. PWM is an abbreviation for Pulse Width Modulation.

The memory 12 includes a nonvolatile memory in which a program is stored, a volatile memory in which a calculation result of the processing device 11, output values (AD values) of the AD converters 13 and 14, and the like are stored, and the like.

The current value output from the current detection circuit is input to the first AD converter 13. The first AD converter 13 performs AD conversion on the current value and outputs an AD value. The AD value is a result of calculating the current value input to the first AD converter 13, and is also referred to as a current calculation result Ir. The current calculation result Ir correlates with a current value and corresponds to a detection signal. The current calculation result Ir is also referred to as a current AD value.

The processing device 11 is configured to be able to refer to the current calculation result Ir. It can also be said that the processing device 11 acquires the current calculation result Ir. The processing device 11 performs abnormality detection such as overcurrent prevention and circuit disconnection detection using the current calculation result Ir. The processing device 11 estimates whether or not current detection in the current detection circuit is a failure using the current calculation result Ir. Further, the processing device 11 may perform abnormal-time control such as stopping the driving control of the motor 200 using the current calculation result Ir.

The second AD converter 14 is electrically connected to the battery 300 (power supply path). The second AD converter 14 measures a power supply voltage of the battery 300. The second AD converter 14 performs AD conversion on the power supply voltage and outputs an AD value. The AD value of the second AD converter 14 is also referred to as a voltage AD value. The voltage AD value corresponds to a measured value of the power supply voltage measured by the second AD converter 14. The processing device 11 is configured to be able to refer to a voltage AD value (measured value). In the present embodiment, as an example, the second AD converter 14 that measures a post-filter voltage Vfa input via the TT-type filter as the power supply voltage is employed. The second AD converter 14 corresponds to a voltage measurement circuit. Hereinafter, the measured value is also referred to as the post-filter voltage Vfa.

In a case where the current detection in the current detection circuit is a failure, the processing device 11 estimates (current estimation value) the motor current from the measured value. In a case where the current detection in the current detection circuit is a failure, the processing device 11 performs abnormality detection or abnormal-time control by using the current estimation value instead of the current calculation result Ir. This point will be described in detail later.

The timer 15 measures a preset time. Timing at which the second AD converter 14 measures the post-filter voltage Vfa is set to the timer 15. The second AD converter 14 measures the post-filter voltage Vfa when it is clocked to the timing set by the timer 15. The timing of measuring the post-filter voltage Vfa may be referred to as the timing of acquiring the voltage AD value.

(Processing Operation)

Figure 3:
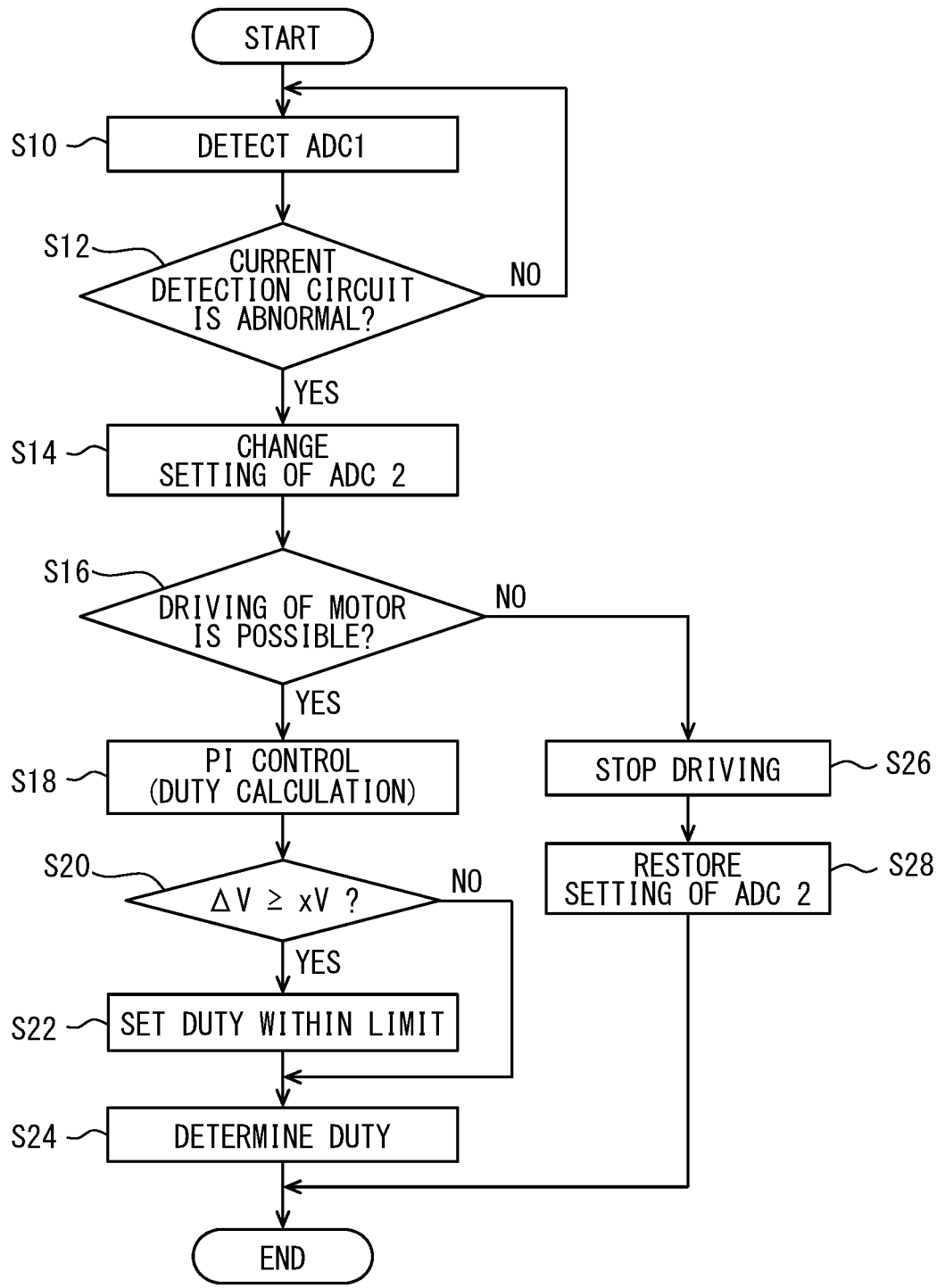
FIG. 3 is a flowchart illustrating a processing operation of a microcomputer according to the first embodiment.
Figure 5:
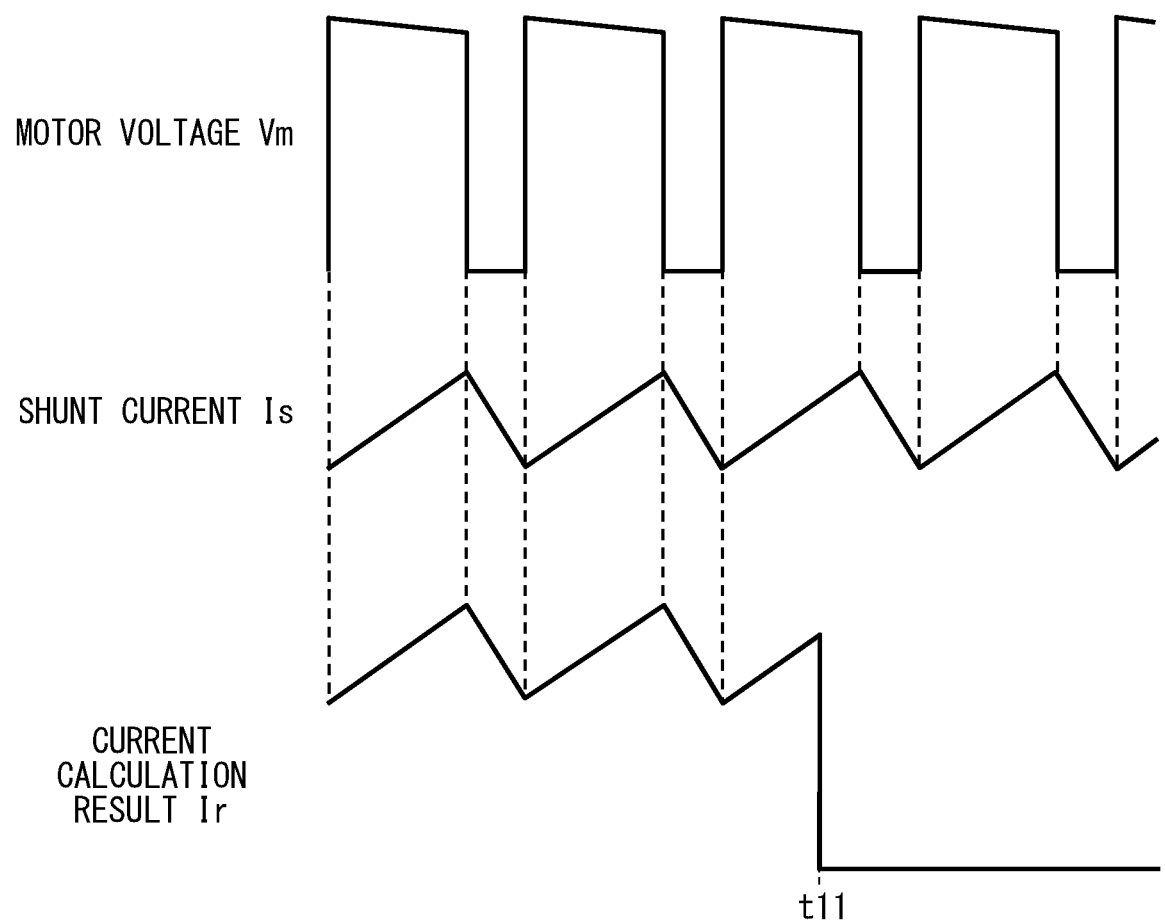
FIG. 5 is a various waveform diagram in a case where a current detection in the current detection circuit in the first embodiment is a failure.

Here, the processing operation of the microcomputer 10 will be described with reference to FIGS. 3 to 5. The microcomputer 10 (processing device 11) executes processing illustrated in a flowchart of FIG. 3 at each predetermined time. The microcomputer 10 executes processing illustrated in the flowchart of FIG. 3 during PWM driving. The processing illustrated in the flowchart of FIG. 3 is mainly executed by the processing device 11 of the microcomputer 10. The processing device 11 operates as multiple functional blocks by executing the program stored in the memory 12. The processing device 11 includes a failure estimation unit, a driving determination unit, and a driving control unit as functional blocks.

In step S10, detection at the ADC 1 is performed. The processing device 11 causes the first AD converter 13 to perform detection. That is, the processing device 11 acquires the current calculation result Ir from the first AD converter 13. It can also be said that the microcomputer 10 detects the current flowing through the motor 200 using the shunt resistor 30.

In step S12, whether or not it is abnormal is determined (failure estimation unit). The processing device 11 determines whether or not the current detection circuit is abnormal using the current calculation result Ir. For example, as indicated by timing t11 in FIG. 5, the processing device 11 determines that it is abnormal when the current value indicated by the current calculation result Ir continues to take 0 A or the same value even though an output duty and the motor rotational speed fluctuate. It can be said that the processing device 11 determines that it is abnormal when the current value indicated by the current calculation result Ir continues to take 0 A or the same value even though the drive voltage is applied to the motor 200. Further, the processing device 11 determines that it is abnormal when the current value indicated by the current calculation result Ir does not become 0 A even though the driving control of the motor 200 is stopped. The abnormality determination of the current detection circuit using the current calculation result Ir is not limited to the above method.

However, even when the current value indicated by the current calculation result Ir indicates abnormality of the current detection circuit, it is not necessarily abnormality of the current detection circuit. That is, the current value indicated by the current calculation result Ir may indicate abnormality of the current detection circuit due to abnormality on the motor 200 side or the like. Therefore, here, it can be said that the processing device 11 does not specify that the current detection circuit is abnormal, but estimates that the current detection in the current detection circuit is a failure. The abnormality on the motor 200 side includes disconnection of the current path of the motor current, and the like.

In step S14, setting of the ADC 2 is changed (driving determination unit). The processing device 11 sets a timing at which the second AD converter 14 measures the post-filter voltage Vfa to the timer 15. Timing of the timer 15 is set such that, for example, the post-filter voltage Vfa is measured once during the ON period of the motor voltage Vm in a state where the current detection in the current detection circuit is not estimated to be a failure. However, when it is estimated that the current detection in the current detection circuit is a failure, a voltage drop ΔV of the post-filter voltage Vfa is measured. Thus, as indicated by measurement points P1 and P2 in FIG. 4, the processing device 11 sets the timing so that the post-filter voltage Vfa is measured twice during one PWM. That is, the processing device 11 sets the timing such that the post-filter voltage Vfa is measured twice during the ON period of the motor voltage Vm.

For example, it is preferable to set the measurement point P1 to a time point at which ringing subsides from a rising edge of the PWM. On the other hand, the measurement point P2 is preferably set to a time point several us before a falling edge of the PWM.

When the processing device 11 estimates that the current detection is a failure, the processing device temporarily stops the driving of the motor 200 and performs step S14. When step S14 ends, the processing device 11 may restart the driving of the motor 200. In this case, the processing device 11 performs energization of an arbitrary energized phase after limiting the duty to be output to some extent. In other words, as described in step S16, the processing device 11 adjusts the ON period of the motor voltage Vm so that the voltage drop ΔV can be measured. Thus, the processing device 11 can appropriately measure the voltage drop ΔV. However, when the processing device 11 estimates that the current detection is a failure, step S14 may be performed without stopping the driving of the motor 200.

Timing of timer 15 may be set such that the post-filter voltage Vfa is always measured twice during one PWM. In this case, step S14 and step S28 described later can be omitted.

In step S16, it is determined whether or not motor driving is possible (driving determination unit). The processing device 11 determines whether or not the driving of the motor 200 is possible on the basis of measured values measured at the measurement points P1 and P2 by the second AD converter 14. In other words, the processing device 11 determines whether or not the motor 200 is abnormal.

More specifically, the second AD converter 14 outputs measured values at the measurement point P1 at the timing t1 and the measurement point P2 at the timing t2 on the basis of a result over time of the timer 15. The processing device 11 acquires the measured value at the measurement point P1 and the measured value at the measurement point P2. The processing device 11 measures the voltage drop ΔV of the post-filter voltage Vfa from the measured values measured at the measurement points P1 and P2. At this time, the processing device 11 performs energization of an arbitrary energized phase after limiting the output duty to some extent, and measures the voltage drop ΔV at the measurement points P1 and P2.

When the voltage drop ΔV is not observed, no current flows through the motor 200, and it can be determined that there is a failure such as disconnection on the motor 200 side. Thus, when there is no voltage drop ΔV, the processing device 11 determines that the driving control of the motor 200 is impossible, and proceeds to step S26.

On the other hand, when the expected voltage drop ΔV is observed, it is determined that the current detection circuit has a failure such as disconnection of the detection line 85. For example, as illustrated at timing t11 in FIG. 5, when the shunt current Is is flowing even though the current calculation result Ir does not change, an assumed voltage drop ΔV is observed. Thus, the processing device 11 can determine that the current detection circuit has a failure such as disconnection of the detection line 85.

When the voltage drop ΔV is present, the processing device 11 determines that the driving control of the motor 200 is possible, and the process proceeds to step S18. In step S16, it is determined that the expected voltage drop ΔV is observed when the voltage drop ΔV reaches the predetermined value, and it is determined that the voltage drop ΔV is not observed when the voltage drop ΔV does not reach the predetermined value.

Incidentally, in a case where the TT-type filter is not provided, the voltage drop ΔV of the power supply voltage is less likely to occur or the voltage drop ΔV is too large depending on the power supply capability of the battery 300 or the like. On the other hand, by providing the TT-type filter, the voltage drop ΔV of the post-filter voltage Vfa occurs according to the current flowing through the motor 200 regardless of the power supply capability of the battery 300 or the like. Therefore, the processing device 11 can measure the voltage drop ΔV with higher accuracy than a case where the TT-type filter is not provided.

Here, a case where the processing device 11 determines that the driving control of the motor 200 is possible will be described. That is, the driving control of the motor 200 when the driving control of the motor 200 is determined to be possible even though the current detection is a failure will be described.

In step S18, PI control is performed (driving control unit). The processing device 11 calculates the duty of the PWM control related to the switching control of the inverter circuit 20 on the basis of the rotation speed (actual rotation speed) of the rotor calculated as described above and the target rotation speed from the host control device. The duty here is a provisional value.

When YES is determined in step S16, the processing device 11 may perform step S18 after performing the start control of the motor 200. The magnitude of the voltage drop ΔV is proportional to the motor current. Thus, the processing device 11 performs start-up control while adjusting the output duty so that the magnitude of the voltage drop ΔV is equal to or less than a certain value.

In step S20, it is determined whether the voltage drop ΔV≥xV (driving control unit). The processing device 11 proceeds to step S22 when determining that the voltage drop ΔV≥xV, and proceeds to step S24 when not determining that the voltage drop ΔV≥xV.

In step S22, the duty is set within the limit (driving control unit). When the output duty becomes greater than or equal to a certain value, the voltage drop ΔV of the post-filter voltage Vfa cannot be measured. Accordingly, the processing device 11 sets the duty within the limit so that the voltage drop ΔV of the post-filter voltage Vfa can be measured. As described above, when determining that the driving control is possible in step S16 and executing the driving control of the motor 200, the processing device 11 adjusts the ON period of the motor voltage Vm so that the voltage drop ΔV can be measured.

In step S24, the duty is determined (driving control unit). The processing device 11 determines a duty at the time of sensorless driving. When YES is determined in step S20, the processing device 11 determines the duty set in step S22. When NO is determined in step S20, the processing device 11 determines the duty set in step S18. The processing device 11 executes the flowchart of FIG. 3 every 1 ms, for example. Therefore, the duty in step S24 is updated every 1 ms.

The processing device 11 drives the motor 200 by performing PWM control on the inverter circuit 20 with the duty determined in step S24. At this time, the processing device 11 estimates that the current detection in the current detection circuit is a failure. Thus, instead of the current calculation result Ir, the processing device 11 performs the abnormality detection and the abnormal-time control by using the current estimation value estimated from the post-filter voltage Vfa measured by the second AD converter 14. That is, the processing device 11 performs safe motor driving by current value estimation and duty feedback. It can also be said that the processing device 11 performs the driving control of the motor 200 in an evacuation traveling mode. The processing device 11 may perform the driving control of the motor 200 by voltage feedback.

Next, a case where the processing device 11 determines that the driving control of the motor 200 is impossible will be described. In step S26, driving is stopped (driving control unit). The processing device 11 stops driving of the motor 200. Thus, when determining that the driving control of the motor 200 is impossible, the processing device 11 can prevent the inverter circuit 20 from being controlled even though the driving control of the motor 200 is impossible. In step S28, the setting of the ADC 2 is restored (driving control unit). That is, the processing device 11 restores the timing set in the timer 15 in step S14 to the original timing. Step S28 can be omitted.

Effects

With the control device 100 disclosed herein, when a current detection failure is estimated, whether or not the driving control of the motor 200 is possible is determined using the measured value of the post-filter voltage Vfa. When determining that the driving control is possible, the control device 100 continues the driving control of the motor 200 while using the current value estimated from the measured value of the post-filter voltage Vfa. Thus, the control device 100 can drive the motor 200 regardless of the detection result of the current detection circuit. That is, the control device 100 can drive the motor 200 while performing the abnormality detection and the abnormal-time control regardless of the detection result of the current detection circuit.

Further, when the driving control of the motor 200 is possible, it can be said that the control device 100 can control the driving of the motor 200 even when the current detection in the current detection circuit is a failure. Thus, the control device 100 can suppress the stop of the fuel supply to the engine by the fuel pump when the driving control of the motor 200 is possible. Therefore, the control device 100 can continue the fuel supply to the engine and can bring the vehicle into a drivable state.

The microcomputer 10 may measure a power supply terminal voltage of the power supply terminal 72. The microcomputer 10 measures the power supply terminal voltage using an AD converter, which is not illustrated, similarly to the post-filter voltage Vfa and the like. The AD converter is connected to a power supply path between the power supply terminal 72 and the coil 40.

Thus, the processing device 11 acquires the measured value of the power supply terminal voltage (hereinafter, simply the power supply terminal voltage) from the AD converter. In the microcomputer 10, the second AD converter 14 and the like are set so that the post-filter voltage Vfa and the power supply terminal voltage are simultaneously measured.

The processing device 11 uses, as the measured value, a value obtained by subtracting a voltage fluctuation amount of the battery 300 using the post-filter voltage Vfa and the power supply terminal voltage. Thus, the processing device 11 can suppress an error of the voltage drop ΔV due to the voltage fluctuation of the battery 300.

The preferred embodiments of the present disclosure have been described above. However, the present disclosure is not limited to the above embodiments at all, and various modifications can be made without departing from the gist of the present disclosure. Hereinafter, second to fourth embodiments will be described as other embodiments of the present disclosure. Each of the above embodiment and the second to fourth embodiments can be carried out alone, or can be carried out in appropriate combination. The present disclosure is not limited to the combinations illustrated in the embodiments, and can be implemented by various combinations.

Second Embodiment

Figure 6:
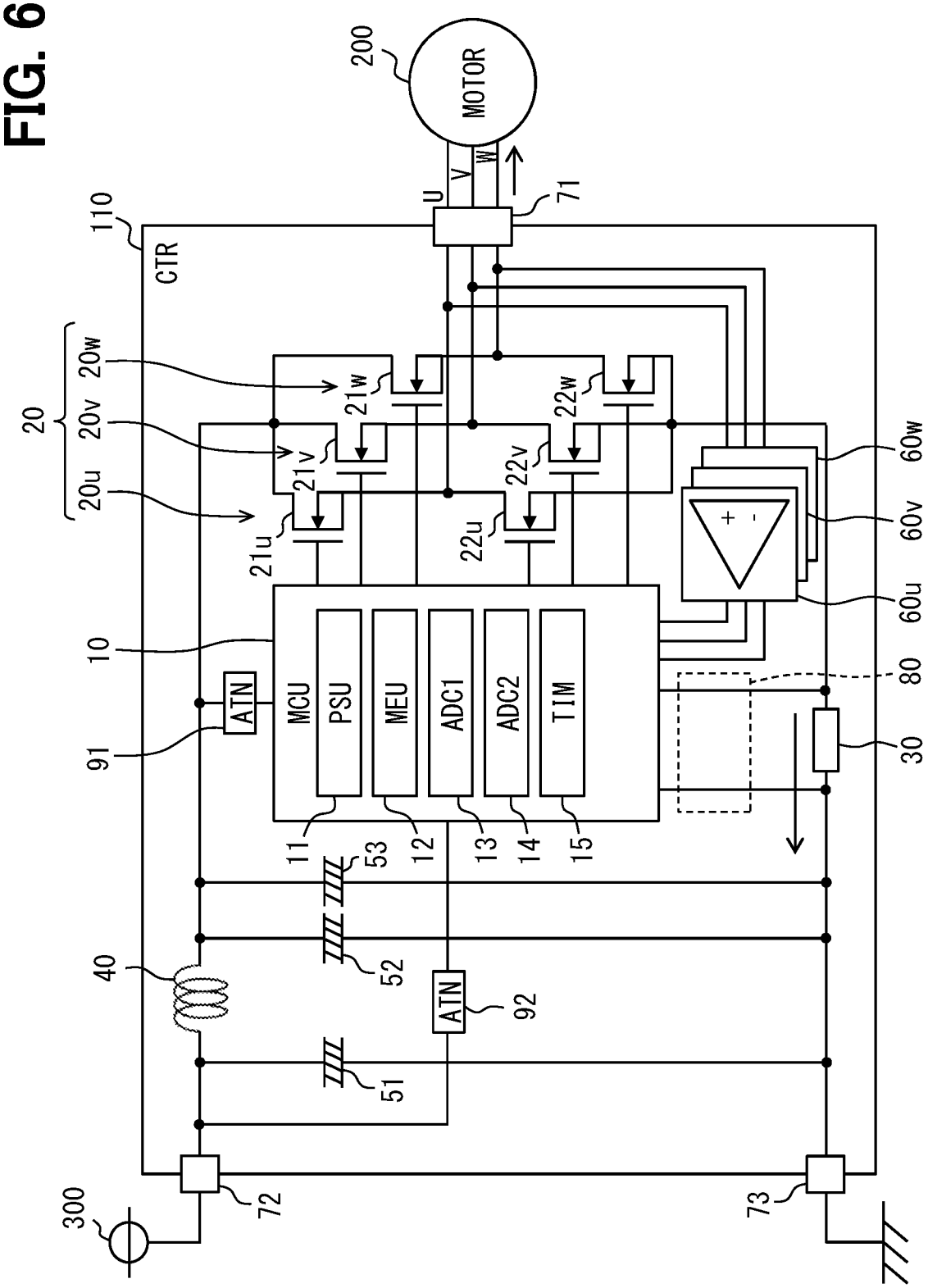
FIG. 6 is a block diagram illustrating a schematic configuration of a control device in a second embodiment.

A controller 110 according to a second embodiment will be described with reference to FIG. 6. Here, differences between the controller 110 and the control device 100 according to the first embodiment will be mainly described. In the controller 110, the same components as those of the control device 100 are denoted by the same reference numerals. The controller 110 is different from the control device 100 in that attenuators 91 and 92 are provided.

The post-filter voltage Vfa is applied to the microcomputer 10 via the attenuator 91. The processing device 11 acquires a measured value of the post-filter voltage Vfa applied via the attenuator 91. Therefore, the processing device 11 can acquire the measured value of the post-filter voltage Vfa from which the noise has been removed by the attenuator 91. An input filter may be used in addition to the attenuator 91. The attenuator 91 and the input filter correspond to a noise removal device. The processing device 11 may use a value obtained by removing noise by a software filter as the measured value.

In the microcomputer 10, an AD converter that measures a power supply terminal voltage is electrically connected to the power supply terminal 72 via the attenuator 92. In this case, the AD converter measures the post-filter voltage Vfa applied via the attenuator 92.

The controller 110 can achieve similar effects to those of the control device 100. Since the controller 110 (processing device 11) includes the attenuator 91, the measured value of the post-filter voltage Vfa can be acquired without being affected by an error of the voltage drop ΔV due to the voltage fluctuation of the battery 300.

Third Embodiment

Figure 8:
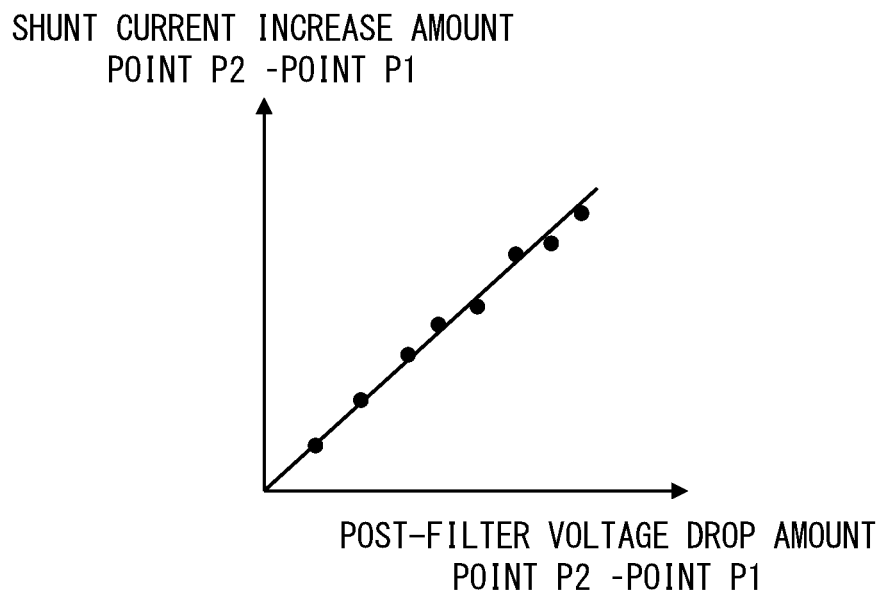
FIG. 8 is a diagram illustrating a relationship between a shunt current increase amount and a post-filter voltage drop amount in the third embodiment.
Figure 9:
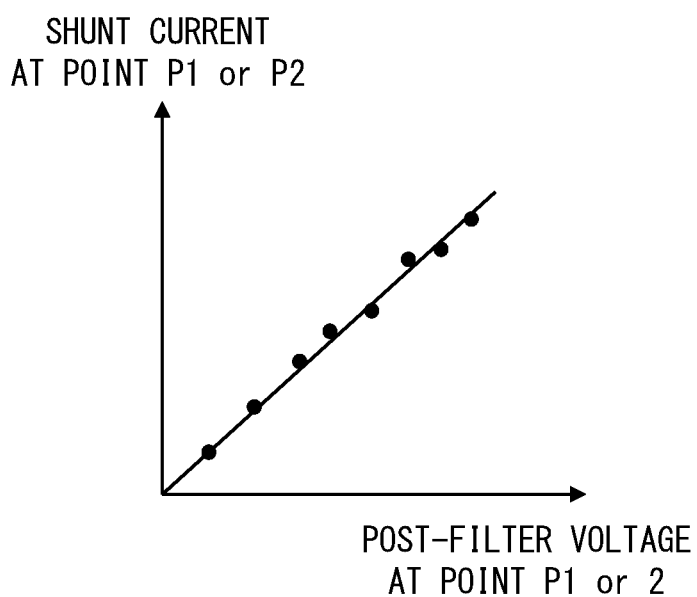
FIG. 9 is a diagram illustrating a relationship between a shunt current and a post-filter voltage in the third embodiment.

A controller according to a third embodiment will be described with reference to FIGS. 7 to 9. Here, differences from the control device 100 according to the first embodiment will be mainly described. The controller according to the present embodiment has the same configuration as the control device 100. Therefore, in the present embodiment, it is described as the control device 100.

Figure 7:
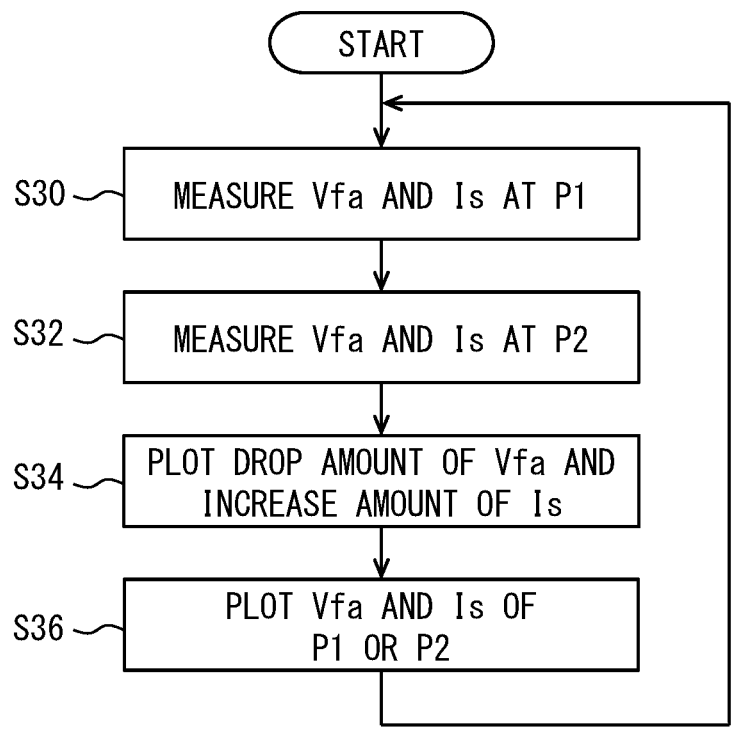
FIG. 7 is a flowchart illustrating processing operation of a microcomputer according to a third embodiment.

When starting the driving control of the motor 200, the microcomputer 10 (processing device 11) performs the processing illustrated in a flowchart of FIG. 7 on condition that the current detection circuit is not determined to be abnormal in step S12. It can also be said that the microcomputer 10 executes steps S30 to S36 at each predetermined time on condition that the current detection circuit is not determined to be abnormal.

In step S30, the post-filter voltage Vfa at the measurement point P1 and the shunt current Is corresponding to the measurement point P1 are measured. Measurement of the post-filter voltage Vfa is equivalent to acquisition of the measured value from the second AD converter 14. Measurement of the shunt current Is is equivalent to acquisition of the current calculation result Ir from the first AD converter 13. Therefore, the processing device 11 acquires the measured value at the measurement point P1 and the current calculation result Ir.

Here, it is assumed that the current detection circuit is normal. Therefore, the shunt current Is and the current calculation result Ir have correlated values.

In step S32, the post-filter voltage Vfa at the measurement point P2 and the shunt current Is corresponding to the measurement point P2 are measured. The processing device 11 acquires the measured value at the measurement point P2 and the current calculation result Ir as in step S30.

In step S34, a drop amount (voltage drop ΔV) of the post-filter voltage Vfa and an increase amount of shunt current Is are plotted. That is, the processing device 11 subtracts the measured value at the measurement point P2 from the measured value at the measurement point P1 to calculate the drop amount of the post-filter voltage Vfa. The processing device 11 calculates the increase amount of the shunt current Is by subtracting the current calculation result Ir corresponding to the measurement point P1 from the current calculation result Ir corresponding to the measurement point P2. The processing device 11 stores the drop amount of the post-filter voltage Vfa and the increase amount of the shunt current Is in the memory 12. The processing device 11 repeatedly executes steps S30 to S34 to store the correlation between the drop amount and the increase amount as illustrated in FIG. 8.

In step S36, the post-filter voltage Vfa at the measurement point P1 or the measurement point P2 and the shunt current Is are plotted. Here, as an example, the measurement point P1 is employed. The processing device 11 stores the measured value at the measurement point P1 and the current calculation result Ir in the memory 12. The processing device 11 repeatedly executes steps S30 to S36 to store the correlation between the post-filter voltage Vfa and the shunt current Is as illustrated in FIG. 9.

As described above, the processing device 11 records the correlation (correlation data) between the post-filter voltage Vfa and the shunt current Is on condition that the current detection circuit is not determined to be abnormal in step S12. In other words, the processing device 11 stores the plurality of post-filter voltages Vfa and the plurality of shunt currents Is correlated with respective post-filter voltages Vfa in the memory 12 in association with each other.

The processing device 11 uses the correlation data when making a YES determination in step S16 and controlling driving of the motor 200 (driving control unit). That is, when measuring the post-filter voltage Vfa, the processing device 11 selects the shunt current Is associated with the measured value from the correlation data. The processing device 11 uses the selected shunt current Is as an estimated current value. Therefore, the processing device 11 performs the driving control of the motor 200 while using the selected shunt current Is.

The control device 100 can achieve similar effects to those of the first embodiment and the second embodiment. The control device 100 can acquire shunt current Is with high accuracy from the measured value of the post-filter voltage Vfa.

Fourth Embodiment

Figure 10:
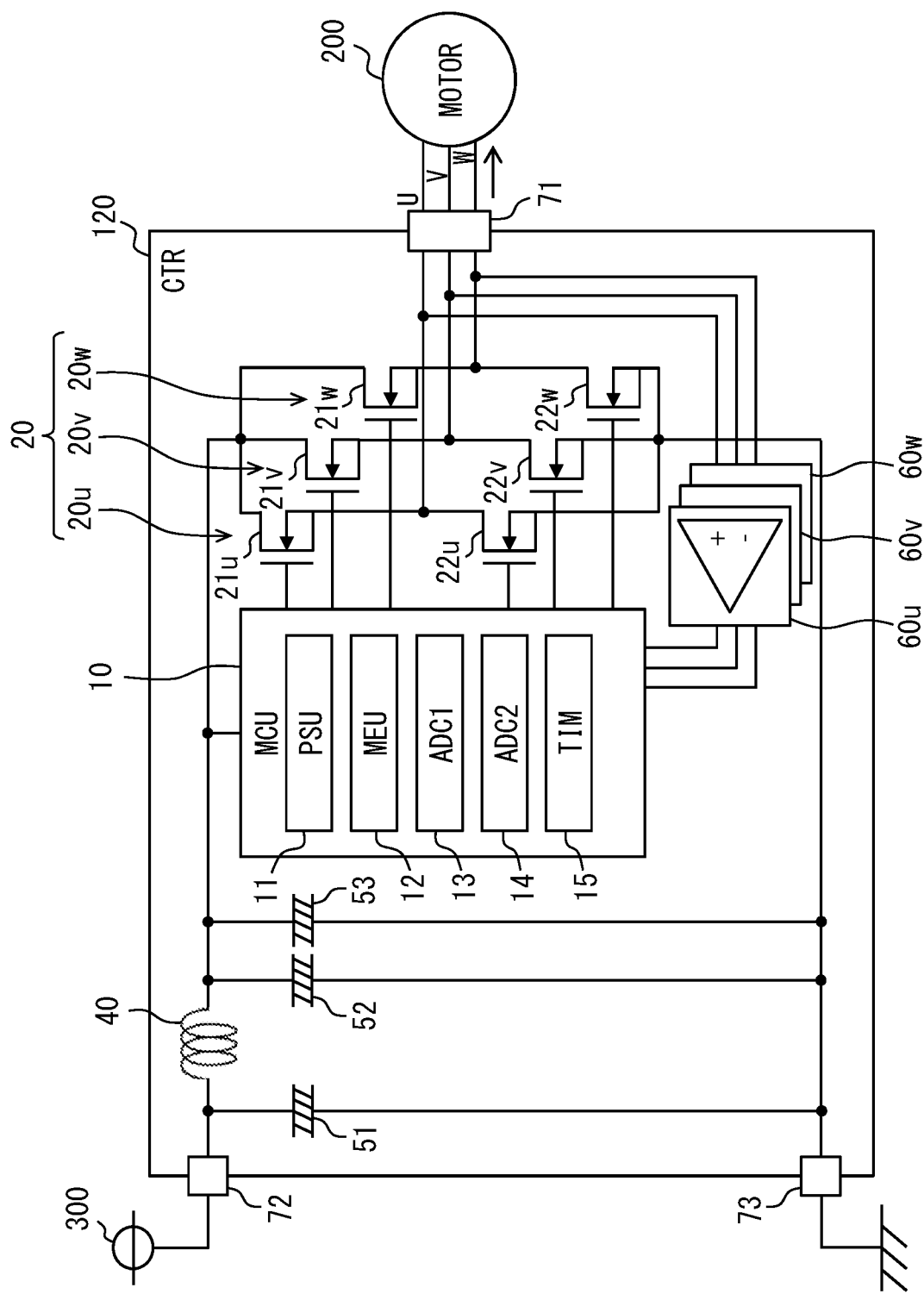
FIG. 10 is a block diagram illustrating a schematic configuration of a control device in a fourth embodiment.

A controller 120 according to a fourth embodiment will be described with reference to FIG. 10. Here, differences between the controller 120 and the control device 100 according to the first embodiment will be mainly described. In the controller 120, the same components as those of the control device 100 are denoted by the same reference numerals. The controller 120 is different from the control device 100 in that the current detection circuit is not provided.

The controller 120 (microcomputer 10) performs the driving control of the motor 200 by the rectangular wave sensorless control as does the control device 100. The controller 120 also performs the driving control of the motor 200 while using a measured value of the power supply voltage (such as post-filter voltage Vfa) measured by the second AD converter 14. That is, the microcomputer 10 estimates the motor current from the measured value, and performs the abnormality detection and the abnormal-time control using the current estimation value.

Thus, the controller 120 can drive the motor 200 regardless of the detection result of the current detection circuit. The controller 120 does not need to include the current detection circuit. Therefore, the controller 120 can reduce the cost.

However, the motor current is more accurate when detected by the current detection circuit than when the motor current is estimated from the measured value. Accordingly, the present embodiment is preferably implemented in combination with the third embodiment. Thus, the controller 120 can accurately drive the motor 200 regardless of the detection result of the current detection circuit.

Although the present disclosure has been described in accordance with the embodiments, it is understood that the present disclosure is not limited to the embodiments and structures. The present disclosure also encompasses various modifications and variations within the scope of equivalents. In addition, while various combinations and modes are described in the present disclosure, other combinations and modes including only one element, more elements, or less elements therein are also within the scope and spirit of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. A motor control device, comprising
a controller configured to perform driving control of a motor via a drive circuit that converts a power supply voltage of a direct current (DC) power supply into a drive voltage of the motor, the controller including a voltage measurement circuit configured to measure the power supply voltage, wherein
the controller acquires a detection signal correlated with a current value that is output from a current detection circuit, the current value flows through a winding of the motor in response to the drive voltage being applied to the motor, and
the controller includes
a failure estimation unit configured to estimate a current detection failure in the current detection circuit by using the detection signal,
a driving determination unit configured to determine whether the driving control of the motor is possible by using a measured value of the power supply voltage measured by the voltage measurement circuit when the failure estimation unit estimates the current detection failure, and
a driving control unit configured to (i) stop the driving control when the driving determination unit determines that the driving control is impossible, and (ii) estimate the current value from the measured value, and continues the driving control by using the current value estimated when the driving determination unit determines that the driving control is possible.

2. The motor control device according to claim 1, wherein
the controller controls the drive circuit to convert the power supply voltage into the drive voltage that repeats turning on and off to perform the driving control of the motor,
the voltage measurement circuit measures a voltage drop of the power supply voltage from the measured value when the drive voltage is on, and
the driving determination unit determines that the driving control of the motor is impossible when the voltage drop is absent, and determines that the driving control of the motor is possible when the voltage drop is present.

3. The motor control device according to claim 2, wherein
in a case where the driving control unit performs the driving control when the driving determination unit determines that the driving control of the motor is possible, the driving control unit adjusts an on period of the power supply voltage such that the voltage drop is to be measured.

4. The motor control device according to claim 1, wherein
the controller stores a correlation between the detection signal and the measured value on condition that the failure estimation unit does not estimate the current detection failure, and
the driving control unit estimates the current value from the measured value by using the correlation.

5. The motor control device according to claim 1, further comprising
a filter that is provided in a power supply path between the DC power supply and the controller, and includes a coil, an input-side capacitor having one terminal connected between the DC power supply and the coil, and an output-side capacitor having one terminal connected between the controller and the coil, wherein
the voltage measurement circuit measures a post-filter voltage input via the filter as the power supply voltage.

6. The motor control device according to claim 5, wherein
the controller simultaneously measures the post-filter voltage by the voltage measurement circuit and a power supply terminal voltage that is a voltage of a power supply terminal to which the DC power supply is connected, and uses, as the measured value, a value obtained by subtracting a voltage fluctuation amount of the DC power supply using the post-filter voltage and the power supply terminal voltage.

7. The motor control device according to claim 1, further comprising
a noise removal device between the DC power supply and the voltage measurement circuit.

8. The motor control device according to claim 1, wherein
the controller uses, as the measured value, a value obtained by removing noise by a software filter.

9. A motor control device, comprising:
a processor configured to perform driving control of a motor via a drive circuit that converts a power supply voltage of a direct current power supply into a drive voltage of the motor; and
a voltage measurement circuit configured to measure the power supply voltage, wherein
the processor is configured to acquire a detection signal correlated with a current value that is output from a current detection circuit, the current value flows through a winding of the motor in response to the drive voltage being applied to the motor,
the processor is further configured to
estimate a current detection failure in the current detection circuit by using the detection signal,
determine whether the driving control of the motor is possible by using a measured value of the power supply voltage measured by the voltage measurement circuit when estimating the current detection failure,
stop the driving control when determining that the driving control is impossible, and
estimate the current value from the measured value, and continue the driving control by using the current value estimated when determining that the driving control is possible.

* * * * *